United States Patent
Groth et al.

(10) Patent No.: US 8,061,981 B2
(45) Date of Patent: Nov. 22, 2011

(54) BLADE FOR A FLOW MACHINE

(75) Inventors: Pieter Groth, Göteborg (SE); Hans Mårtensson, Trollhättan (SE)

(73) Assignee: Volvo Aero Corporation, Trollhattan (SE)

( * ) Notice: Subject to any disclaimer, the term of this patent is extended or adjusted under 35 U.S.C. 154(b) by 504 days.

(21) Appl. No.: 11/719,412

(22) PCT Filed: Dec. 3, 2004

(86) PCT No.: PCT/SE2004/001808
§ 371 (c)(1),
(2), (4) Date: May 16, 2007

(87) PCT Pub. No.: WO2006/059935
PCT Pub. Date: Jun. 8, 2006

(65) Prior Publication Data
US 2009/0202338 A1    Aug. 13, 2009

(51) Int. Cl.
*F01D 9/02* (2006.01)
(52) U.S. Cl. .................... 415/191; 416/90 R
(58) Field of Classification Search ............ 416/90 R, 416/91, 97 R, 232, 213 R, 213 A, 142, 233, 416/234; 415/209.3, 181, 191, 215.1, 142; 29/889.22
See application file for complete search history.

(56) References Cited

U.S. PATENT DOCUMENTS

| | | | | |
|---|---|---|---|---|
| 4,827,588 A * | 5/1989 | Meyer | ........................ | 29/889.22 |
| 6,050,777 A * | 4/2000 | Tabbita et al. | .............. | 416/97 R |
| 6,139,258 A * | 10/2000 | Lang et al. | ..................... | 415/116 |
| 6,164,912 A * | 12/2000 | Tabbita et al. | .............. | 416/97 R |
| 6,705,383 B2 * | 3/2004 | Beeck et al. | ................ | 29/889.72 |
| 2003/0007864 A1 * | 1/2003 | Shelton et al. | .............. | 416/97 R |
| 2004/0197191 A1 * | 10/2004 | Cunha et al. | ................ | 416/97 R |

FOREIGN PATENT DOCUMENTS

| | | |
|---|---|---|
| EP | 0503696 A1 | 9/1992 |
| EP | 0924382 A2 | 6/1999 |
| EP | 1467064 A2 | 10/2004 |
| GB | 1039806 A | 8/1966 |
| GB | 2095589 A | 10/1982 |

OTHER PUBLICATIONS

International Search Report for corresponding International Application PCT/SE2004/001808.
International Preliminary Report on Patentability for corresponding International Application PCT/SE2004/001808.

* cited by examiner

*Primary Examiner* — Richard Edgar
(74) *Attorney, Agent, or Firm* — WRB-IP LLP

(57) ABSTRACT

In a blade intended to be exposed to a gas flow at high speed during operation of a flow machine comprising the blade, the blade includes a front end designed to face towards the incoming gas flow and a rear end. The front end is provided with a concave area that is such that during operation a stagnation point for the incoming gas flow arises at a distance in front of an outer blade surface that defines the concave area and such that the outer blade surface is thereby at least partially protected from the incoming gas flow.

22 Claims, 4 Drawing Sheets

BLADE FOR A FLOW MACHINE

BACKGROUND AND SUMMARY

The present invention relates to a blade intended to be exposed to a gas flow at high speed, during operation of a flow machine comprising the blade, which blade comprises a front end designed to face towards the incoming gas flow and a rear end.

By flow machine is meant primarily a gas turbine, but the invention can also be implemented in other types of flow machines, such as a steam turbine or a pump. The invention will be described in the following for the gas turbine application.

In addition, the invention relates to a section for a flow machine component, such a flow machine component, a gas turbine and an aircraft engine, all provided with at least one blade according to the invention.

A gas turbine comprises a compressor stage, a turbine stage and, for example in the case of an aircraft engine, for many types of aircraft engine, a fan duct or a fan stage. The gas turbine blade according to the invention can be arranged in and form part of at least one of these parts of the gas turbine.

The gas turbine blade forms thereby a component in a gas turbine, whereby during operation it is subjected to a fluid flowing rapidly along it from its front end towards its rear end. The gas turbine blade has normally an aerodynamic design and forms preferably a guide or a structurally-supporting element in a stator, but can also form a vane in a rotor.

Gas turbine blades, that form vanes, guides and structurally-supporting elements, that are used in gas turbines in, for example, aircraft engines and that are subjected to rapidly flowing fluid are well known and well documented in previous technology.

The manufacture of gas turbine blades can be carried out by constructing them from side walls or blade halves, or simply from a single plate that is then joined together at the front edge and, if necessary, at the back edge to create a front end and a rear end. As gas turbine blades are normally made of metal, the said joining together is preferably carried out by welding. The joint can alternatively be a glued joint or a joint created by a chemical reaction at the junction between the side walls, particularly if the gas turbine blade is made of a composite material that comprises plastic.

In operation, a flow of fluid at high speed passes the gas turbine blades in a direction from their front end to their rear end. Accordingly if, for example, the joint creates an unevenness on the surface where it is positioned, it can significantly affect the flow picture and hence the aerodynamics of the whole gas turbine blade. It is, of course, desirable to avoid an adverse effect on the aerodynamics caused by the joint, and to avoid degradation and weakening of the joint caused by the effect of the fluid on the joint.

According to previously-known technology, this problem is solved by precise control of the joining process to achieve high quality joints and by subsequent monitoring that the required quality has actually been achieved. This is, of course, labor-intensive and expensive.

In general, whether or not there is a joint, it can, in addition, be desirable to minimize the effect of the fluid on the front end of the gas turbine blades and to minimize the effect of the front end on the aerodynamics of the blade.

It is desirable to provide a blade of the type described in the introduction, where the design of the blade is such that there is a reduction in the stresses to which the front end is subjected during operation on account of the rapid flow of gas that passes the blade. It is also desirable to provide a blade that has a design that is such that it avoids any unevenness at the front end resulting in unfavorable effects on the flow of the gas that passes during operation, which unevenness, for example, can be caused by the manufacturing process.

The design of the blade should enable reliable and cost-effective industrial production of the said blades to be carried out.

In a blade according to an aspect of the present invention, the front end is provided with a concave area that is such that a stagnation point for the incoming flow of gas arises during operation at a distance in front of the outer blade surface that defines the concave area and in that the outer blade surface is thereby at least partially protected from the incoming gas flow. The shape and size of the concave area are thus such that the stagnation point for the gas flow arises in front of the concave area.

By stagnation point is meant a point at which the fluid has a low speed or is even stationary between the stagnation point and the blade. The speed is at least lower or essentially lower than the speed of the fluid that flows along the side walls of the blade. In other words, the fluid in the area of the front end, and more specifically within the concave area, will be stationary or will only flow slowly in conditions where fluid is otherwise passing rapidly. This makes it possible to position a joint in the concave area, to utilize material at the front end with a lower strength or resistance to wear than would otherwise have been necessary, to have a smaller thickness in the area or to make less stringent demands concerning the surface finish.

According to a preferred embodiment, the concave area extends from the root of the blade to the top. In this way, it is guaranteed that the required effect is achieved along the whole length of the blade.

According to an aspect of the invention, a joint, such as a welded joint, that joins together two side walls in the area of the front end, can be arranged and can extend within the concave area. If the concave area extends over the front end and the speed of the flow of fluid varies over the width of the concave area, the joint is suitably positioned where the flow can be expected to be the slowest. Normally, however, the joint is positioned in the area of a center line for the concave area, which center line extends in a direction from the root of the blade to the top. The joint is also advantageously positioned where the concave area is deepest.

As a result of an aspect of the invention, a joint that is arranged in the front end of the gas turbine blade has as small an adverse effect as possible on the aerodynamics of the blade and the effect on the joint of a fluid flowing over it rapidly is minimized and the effect on the areas weakened by this joint is minimized. According to a special embodiment, at least one duct is arranged through at least one of the wall parts that forms the front end, within the concave area, and the said duct opens out in one of the side walls at a distance from the front end. In this way, it is possible to control more precisely the flow of fluid beside the joint and also to affect the flow picture along the side walls by means of a suitable design of the ducts in question.

The duct, which is at least one in number, suitably opens out at an acute angle backwards relative to an outer surface of the side wall in which the duct is arranged, which outer surface surrounds the duct. This promotes so-called boundary-layer flow along the said side walls, and means that the air flow follows the outer surfaces of the side walls closely.

An aspect of the invention also comprises a section of a flow machine component, which section comprises a first and a second blade half, that are arranged a distance apart and are intended to form part of two adjacent blades in the component, which define between them a gas duct, with each of the blade halves comprising a front end intended to face towards an incoming gas flow during operation of a flow machine that comprises the component, and a rear end. The front end of each of the blade halves is provided with a concave area that is such that a blade in the component created by two blade halves from adjacent sections gives rise to a stagnation point for the incoming gas flow at a distance in front of an outer blade surface that defines the concave area and such that the outer blade surface is thereby at least partially protected from the incoming gas flow. By placing a plurality of such sections next to each other and joining them together, it is possible to build up a flow machine component for a flow machine in an advantageous way. Each of the sections is preferably cast separately and then joined together by welding. The welded joint is positioned within the concave area.

An aspect of the invention also comprises a flow machine component comprising a plurality of blades extending in a radial direction from an element to which they are attached, which blades are arranged a distance apart in the direction of the circumference of the component, characterized in that at least one of the blades is a blade designed according to the above.

In addition, an aspect of the invention relates to a flow machine component that comprises a plurality of sections that are joined together in the direction of the circumference and form a circular structure, characterized in that at least two of the said sections each form a section as described above.

Similarly, an aspect of the invention relates to a gas turbine that is characterized in that it comprises at least one blade designed as described above, and a gas turbine that is characterized in that it comprises at least one flow machine component as described above.

An aspect of the invention also relates to an aircraft engine that is characterized in that it comprises at least one blade designed as described above, and an aircraft engine that is characterized in that it comprises at least one flow machine component according to the invention.

Additional advantages and characteristics of aspects of the invention are apparent from the following detailed description and from other dependent claims.

BRIEF DESCRIPTION OF DRAWINGS

The invention will be described in the following in greater detail with reference to the attached drawings, in which.

DETAILED DESCRIPTION

Figure 1:
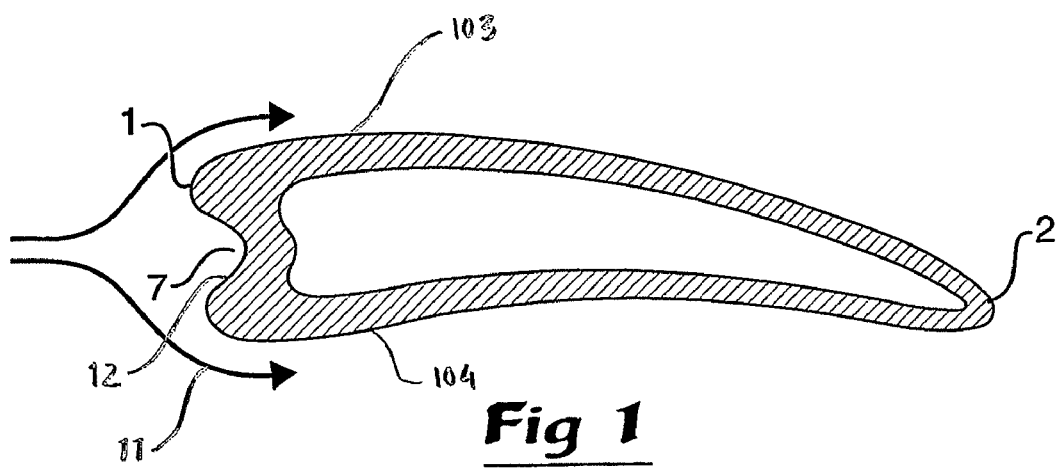
FIG. 1 is a cross section from above of a first embodiment of a blade for a flow machine according to the invention.

FIG. 1 shows a first embodiment of a gas turbine blade according to the invention. The gas turbine blade is preferably an aircraft engine component, for example a vane, a structurally-supporting element or a guide in a gas turbine. FIG. 1 shows only a section through the blade, provided with a concave area 7. The concave area 7 and its function will be described in greater detail with reference also to other embodiments. It is, however, apparent from FIG. 1 how it is intended to affect a gas flow 11 by generating a stagnation point with a slow gas flow immediately in front of or inside the actual concave area and to guide the flow towards the outside of the blade profile.

Figure 2:
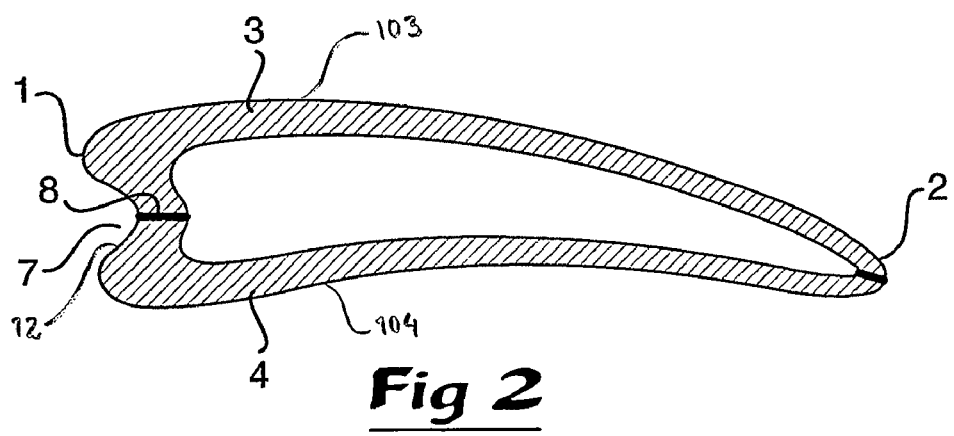
FIG. 2 is a cross section from above of a second embodiment of a blade for a flow machine according to the invention.
Figure 3:
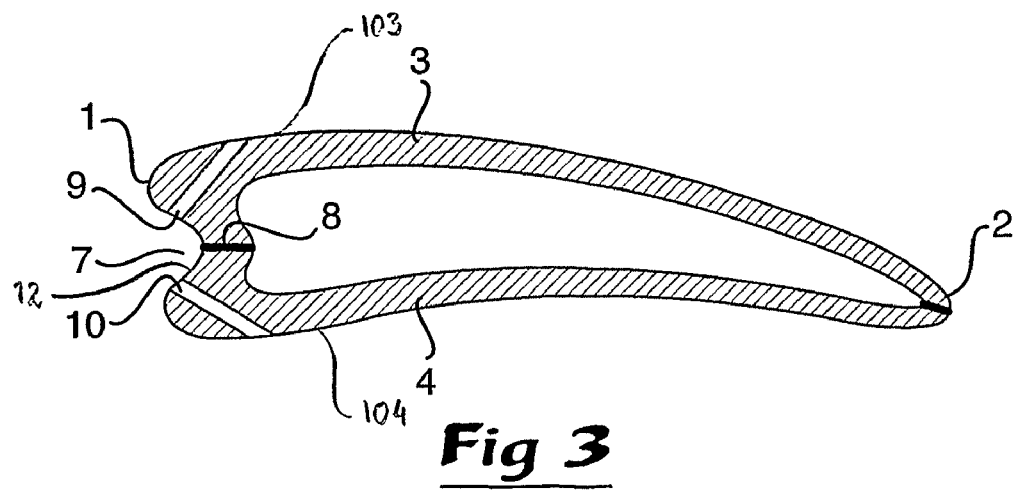
FIG. 3 is a cross section from above of a third embodiment of a blade for a flow machine according to the invention.
Figure 4:
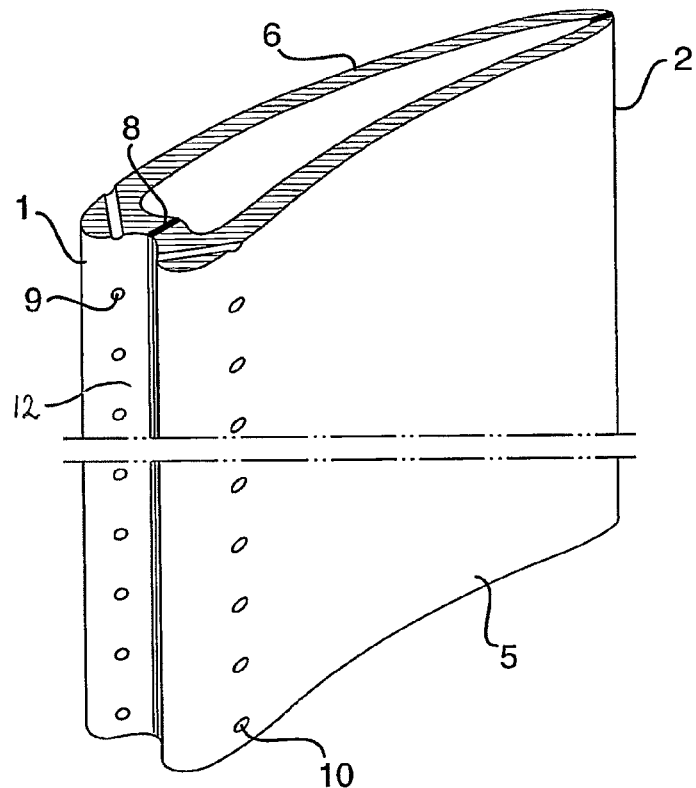
FIG. 4 is a partially sectioned perspective diagram of the blade in FIG. 3.

FIGS. 1-3 show three embodiments of the gas turbine blade. The gas turbine blade comprises a front end 1, a rear end 2, a first side wall 3 and a second side wall 4. It has, in addition, a root 5, see FIG. 4, at which it is intended to be attached to a frame such as a rotor or a stator, and a top 6, that is shown sectioned in FIG. 3. FIG. 4 shows the positions of the front end 1, the rear end 2, the root 5 and the top 6. For the attachment, the root 5 can be provided with special fixing means, which, however, have not been shown here. The top 6 can also be provided with such fixing means and can be arranged to be attached to a constructional component such as a rotor or stator.

According to the second and third embodiments, see FIGS. 2-4, the gas turbine blade is hollow and is formed of two halves, each of which forms one of the side walls 3, 4 and which are joined together at a front edge to form the front end 1 and at a rear edge to form the rear end 2. The halves are preferably made of metal, either by casting or by plate forming and they are joined together by being welded from the outside. They can alternatively be made of some other material, for example a composite material. It is quite possible for the blade profile to be provided with internal transverse structurally-supporting elements or similar reinforcing elements. It is aerodynamically designed with a wing profile and is preferably hollow.

A concave area 7 is arranged at the front end 1, which is wider than the rear end 2 and which, during operation, is subjected to a fluid flowing towards it. The concave area 7 extends along all the part of the length of the blade that will be subjected to fluid passing during operation, suitably along the whole length, from the root 5 to the top 6. It is, of course, possible as an alternative to have a discontinuous concave area. It is also preferable, for reasons associated with stress concentration, for the concave area to be more pronounced in the areas where the blade is attached, that is at the root 5 and/or the top 6, in comparison to its free middle area. A more pronounced concave area can be achieved either by the concave area extending deeper or by the surrounding parts being elongated more in these areas.

The gas turbine blade is preferably provided with the concave area 7 before the joining together of the side walls 3, 4 either by forming of the finished side walls 3, 4 or in association with the manufacture of these.

The concave area 7 has such a width, in a direction transverse to the length of the blade, and such a depth that it guarantees that a stagnation point for the incoming gas flow 11 arises in front of an outer blade surface 12 of the blade. By this means, there is slowly flowing or stationary fluid between the stagnation point and the concave area during operation. The shape of the concave area 7 must, in addition, of course also be such that it guarantees that a stagnation point is produced in front of it. The width of the concave area 7 is preferably at least 10% of the maximum width of the front end 1, more preferably at least 25% of the maximum width of the front end and most preferably approximately 50% of the maximum width of the front end. Similarly, the depth of the concave area 7 is preferably at least 10% of the maximum width of the front end 1, more preferably at least 25% of the maximum width of the front end and most preferably approximately 50% of the maximum width of the front end. By maximum width is meant here the total distance between the outer surfaces of the blade. In the embodiment illustrated, the depth of the concave area is approximately the same size as its width. The total width of the front end corresponds in this case to the greatest thickness of the blade. As seen in FIGS. 1-3, the concave area 7 can be arranged substantially centrally in the front end relative to first and second outer walls 103, 104 that define the blade in transverse direction.

The joint, here indicated by 8, that joins together the side walls 3, 4 at the front end 1 lies in the centre of the concave area 7, at its deepest point, and extends the whole way from the root 5 to the top 6 within the concave area. As a result of this position of the joint 8 in relation to the concave area 7, the effect of the fluid on the joint 8 during operation is reduced and similarly the effect on the aerodynamics of the vane or the guides caused by the joint 8 is reduced. As a result of this, the joint 8 can be allowed to protrude somewhat from the adjacent surrounding surfaces of the gas turbine blade without significantly impairing the aerodynamics as a result.

FIGS. 3 and 4 show a third embodiment of the gas turbine blade according to the invention. The only difference in comparison to the second embodiment is that the blade comprises ducts 9, 10 arranged at the front end 1, in the concave area 7, on each side of the joint 8. It should be recognized that, in such a case, the gas turbine blade should be provided with one or two parallel rows of such ducts with each row extending in the longitudinal direction of the vane or guide. The ducts 9, 10 extend obliquely backwards in the homogenous wall material and open out at the outer surfaces of the side walls 3, 4. As a result of the ducts 9, 10, a flow of fluid through the gas turbine blade is made possible. By means of a suitable design of the ducts 9, 10, it is possible to affect the position of the stagnation point in front of the concave area 7, and also to achieve so-called boundary-layer flow at the outer surfaces of the side walls 3, 4 in the area where the ducts 9, 10 open out. In this way, a flow close to the said outer surfaces can be promoted. The ducts 9, 10 are suitably directed obliquely outwards and backwards from the welded joint 8, viewed or regarded from a center line through the gas turbine blade, in order to promote the flow of fluid through these. The ducts extend only through homogenous material, without flow communication with the blade's central cavity when such is present. It should be emphasized that the arrangement of the ducts 9, 10 does not necessarily need to be combined with the characteristics that relate to the concave area and the position of the welded joint according to the invention, but could be combined with a conventional gas turbine blade profile and thus in itself be the subject of an invention.

Figure 5:
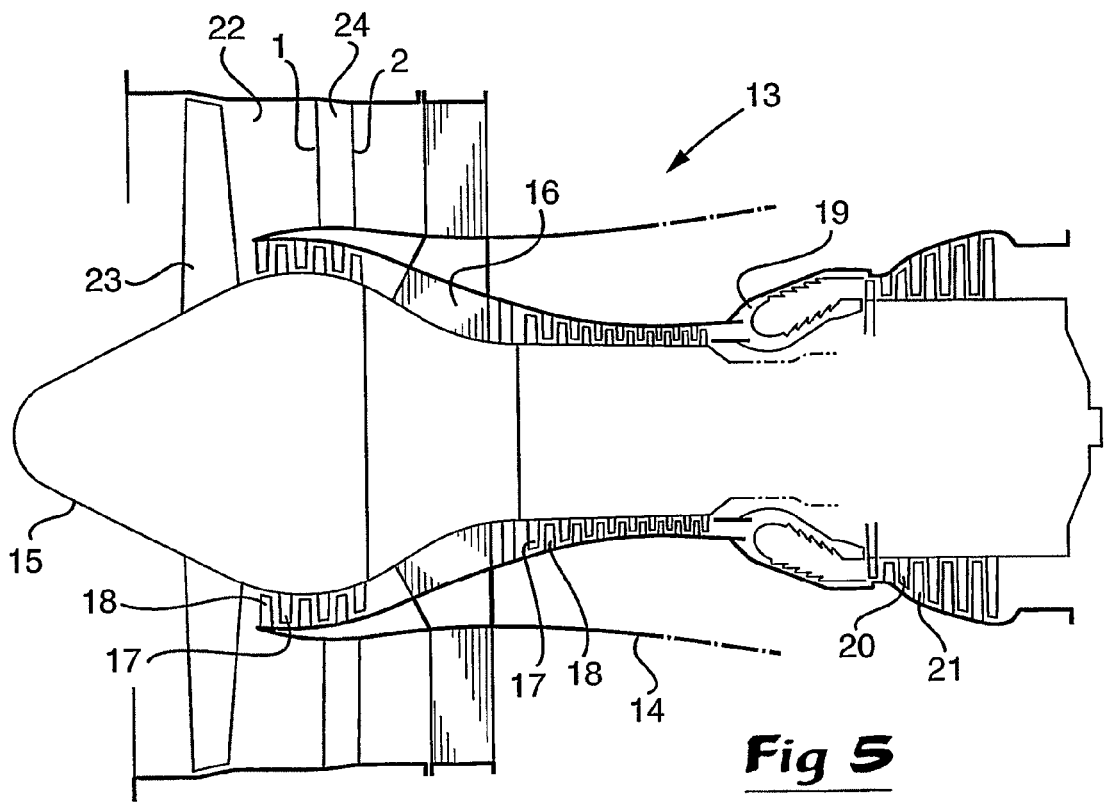
FIG. 5 is a cross section through a schematically-illustrated gas turbine, with gas turbine blades in the form of guides, rotor blades, stator blades and structurally-supporting elements.

FIG. 5 shows schematically a cross section of a gas turbine 13 with a stator 14 and a rotor 15, which is suspended in the stator via structurally-supporting elements 16 in a known way, in such a way that it can rotate. Any bearings have, however, not been illustrated here. The stator is connected in a known way to an aircraft wing (not shown). A first compressor stage is arranged upstream of the structurally-supporting elements 16, that is to the left of these in the figure, in which rows of rotor blades 17 and rows of stator blades 18 are arranged alternately in the direction of the air flow. There is a second compressor stage downstream of the structurally-supporting elements 16, also with alternating rows of rotor blades 17 and rows of stator blades 18. Downstream of the second compressor stage, there is a combustion chamber 19, in which fuel is provided to the compressed air via fuel injectors (not shown) and combustion takes place. Downstream of the combustion chamber 19, there is the actual gas turbine stage, which, like the compressor stages, comprises rows of rotor blades 20 and rows of stator blades 21 arranged alternately viewed in the direction of the gas flow. A fan duct 22 is arranged around the stator 14. At the inlet of this and of the first compressor stage, the rotor 15 is provided with a first row of rotor blades 23. Downstream of this, in the fan duct 22, there is at least one row of aerodynamic guides 24. Each of the structurally-supporting elements 16 in the rows of the previously-mentioned structurally-supporting elements 16 also extends radially through the fan duct 22, downstream of the guides 24.

At least one of the guides 24 in the fan duct 22, the structurally-supporting elements 16 in the compressor air duct and/or in the fan duct 22, and also the rotor blades 20 and the stator blades 21 in the gas turbine stage is advantageously provided with a profile such as the one that characterizes the invention and can be any of those that have been described above for a gas turbine blade. In other words, any of the said guides, rotor blades and stator blades can form a gas turbine blade according to the invention. It is also possible to design rotor blades 17 and stator blades 18 in the compressor stages in accordance with the invention.

Figure 6:
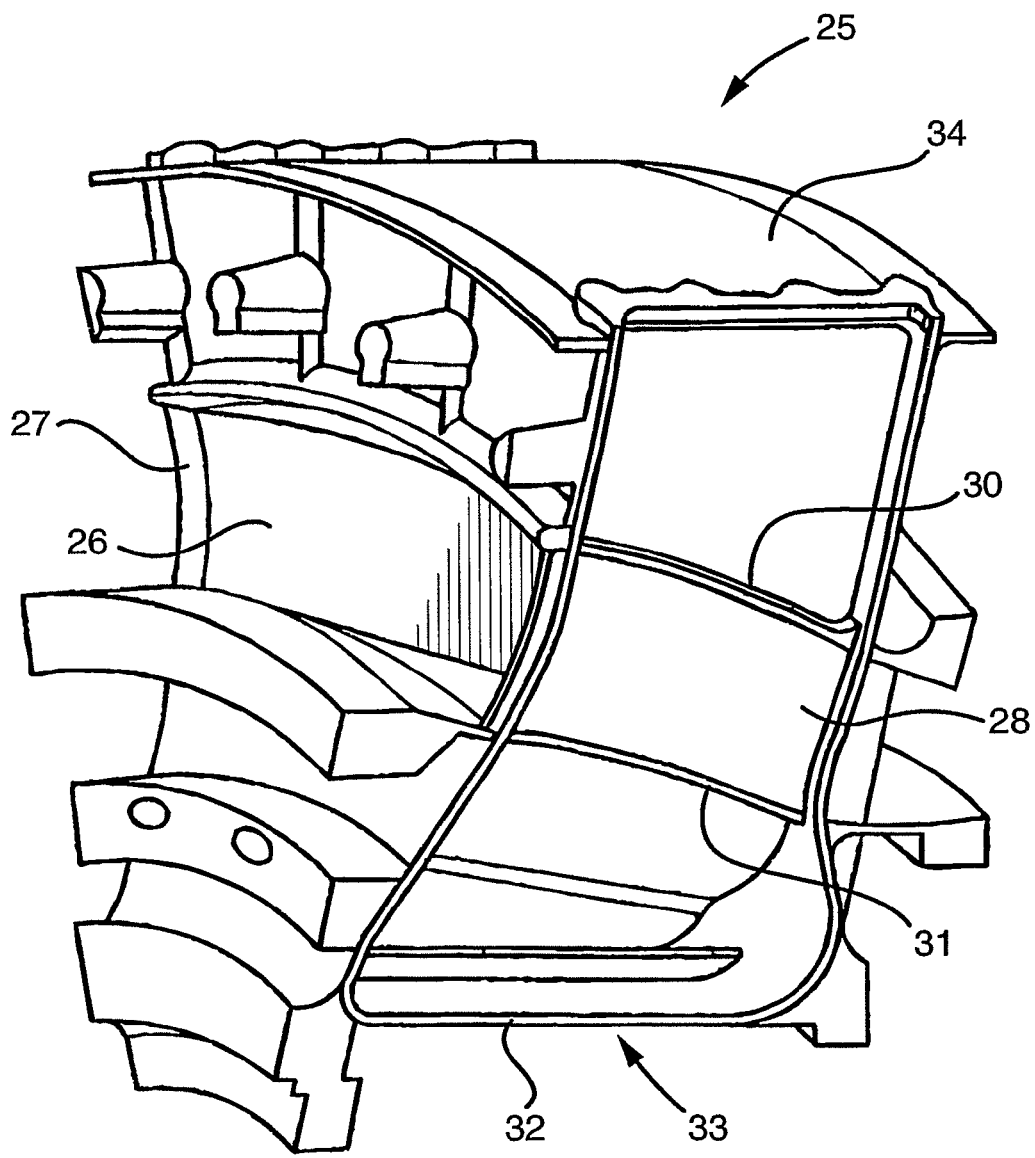
FIG. 6 shows a cast sector according to the invention in a perspective view.
Figure 7:
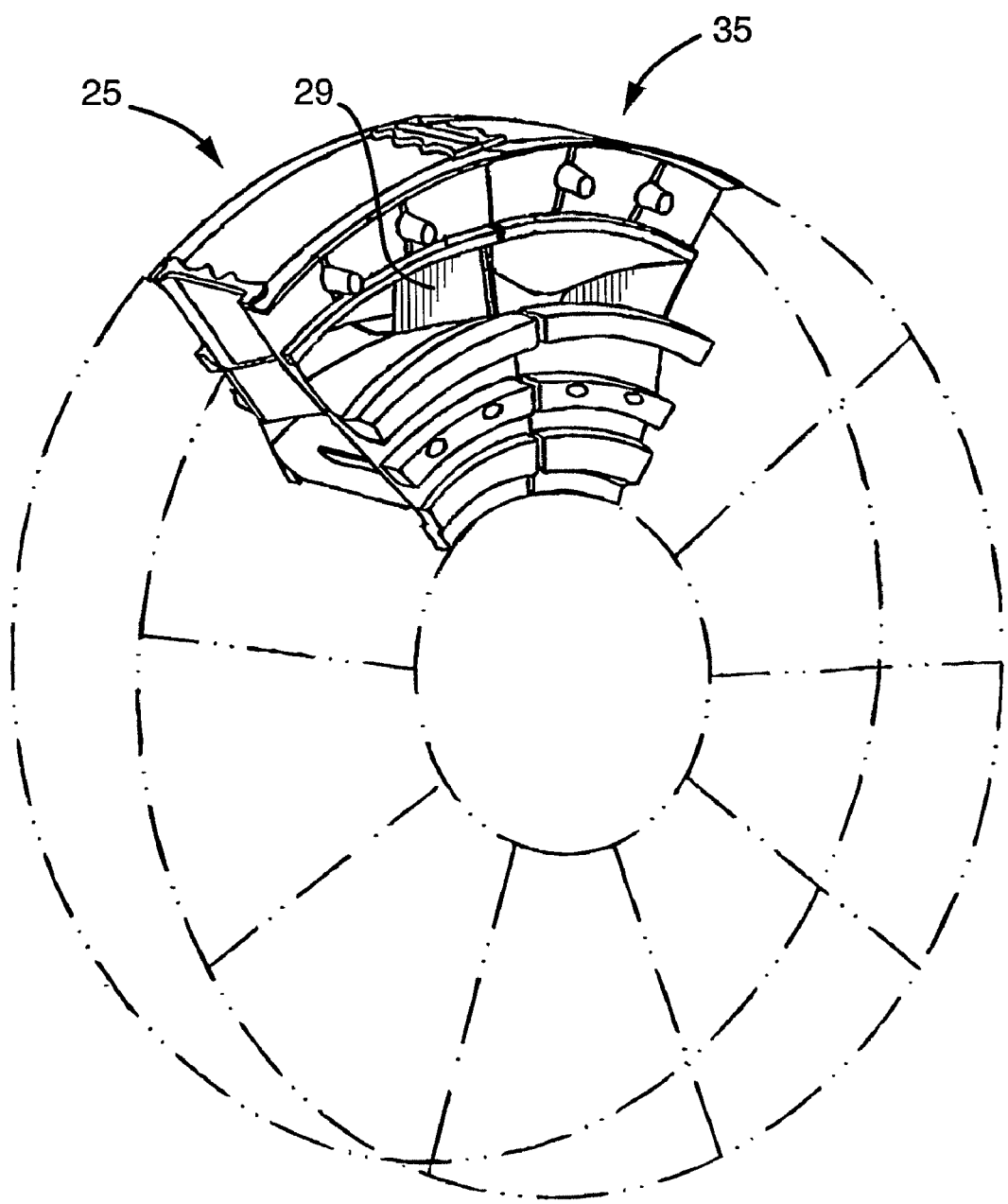
FIG. 7 shows a stator component constructed of a plurality of sectors according to FIG. 6 in the direction of its circumference.

FIGS. 6 and 7 respectively show how a section 25 and a gas turbine component constructed of a plurality of such sections can be constructed. The gas turbine component preferably forms part of a gas turbine that, in turn, forms part of an aircraft engine.

The section 25, that forms a sector of a circle in a gas turbine component, has a gas duct 26 running essentially in an axial direction. It is also possible for there to be one or more gas ducts running in a radial direction for compressor flow (not shown), and also in certain cases for fan flow.

The section 25 comprises blade halves 27, 28 that correspond to the side walls or gas turbine blade halves 3, 4 described above and which delimit between them the gas duct 26 in the direction of the circumference of the stator component.

When two sections 25 are joined together, one blade half 26 together with a corresponding blade half on the adjacent section forms a structurally-supporting element 29 according to the invention, for example the structurally-supporting element 16 in FIG. 4.

The section 25 comprises, in addition, a wall part 30 that extends tangentially between the blade halves 27, 28 and defines the gas duct 26 radially outwards, and a wall part 31 that extends tangentially between the blade halves 27, 28 and defines the gas duct 26 radially inwards.

The section 25 comprising the blade halves 27, 28 has end parts that comprise an elongated continuous surface 32 that delimits the section 25 in the direction of the circumference and that is intended to be welded. The weld surface can thus be said to comprise one continuous curve.

Several different welding methods are possible, but laser or electron beam welding are preferably used.

The first and second blade halves 27, 28 thus extend essentially in the radial direction of the component 25. In addition, they have an extent that is essentially in the axial direction of the component.

The section 25 has, in addition, a curved plate part 33 for delimiting the sector radially inwards, and a curved plate part 34 for delimiting the sector radially outwards.

After placing the sectors next to each other in the direction of the circumference, see FIG. 2, the sectors are thus joined together by welding the sectors' adjacent edges in a radial direction. By this means, the structurally-supporting elements 29 are formed.

A plurality of sections 25, 35 that are identical or that are different but have identical cross sections, constructed in accordance with the description above, are thus arranged alongside each other, see FIG. 6.

The stator component can, for example, form an intake part, an intermediate housing, a turbine exhaust housing, that is a final housing part, or a part of this, for a gas turbine. Its main task is to act as an attachment for bearings, for transferring loads and to provide a duct for gases.

It should be recognized that a number of alternative examples of the gas turbine blade and the method for manufacturing this will be apparent to an expert within the field without circumventing the protection provided by the invention as defined in the attached claims and in the description and the attached drawings.

For example, the invention also covers methods of production where the gas turbine blade comprises a number of sections from its front end to its rear end. In other words, the assembly is then carried out by joining a total of more than two parts, but by joining together two parts to create the front end. The invention includes a joint at the front end being made at an area where, before or after the actual joining together is carried out, a concave area is arranged at the position of the joint.

According to the invention, the side walls extend, however, right up to and form both the front end 1 and the rear end 2. The thickness of the walls of the gas turbine blades according to the invention can vary and differ considerably from what is shown here without deviating from the concept of the invention. Similarly, the material from which the gas turbine blade in question is constructed can vary, for example depending upon its position and hence the operating environment. It is, for example, quite possible for the gas turbine blade according to the invention to be constructed of or at least to comprise metal, a plastic material, a composite material or a compound material. It can be attached either only at its root, as with the rotor blades 20 or stator blades 21, or at both the root 5 and the top 6, as with the guides 24 and the structurally-supporting elements 16.

It should also be recognized that, although the turbine in which the gas turbine blade according to the invention is arranged preferably forms an aircraft engine, it can also be a stationary turbine of any kind in which it can be expected that a fluid such as air or gas passes the gas turbine blade in question at high speed.

The term "blade half" is not to be interpreted as the part in question having to be defined as precisely half a blade. It is quite possible for one blade half to define for example 3A of the blade, while the associated blade half defines the remaining 1A.

It is also possible within the framework of the present invention for the blade to be solid, that is not hollow.

According to an example, a method for manufacturing the blade comprises the steps of forming, preferably by casting, forging or injection-molding, at least one blank to create a first side wall and a second side wall, joining together the side walls to create the front end and forming the side walls in such a way that a concave area is created at the front end. The forming can be carried out in association with making the individual side wall or by reforming it after it has been made. The side walls are welded together within the concave area.

The invention claimed is:

1. A blade intended to be exposed to a gas flow at high speed, during operation of a flow machine comprising the blade, the blade comprising a front end designed to face towards the incoming gas flow and a rear end, the front end being provided with a concave area that forms, during operation, a stagnation point for the incoming gas flow at a distance in front of an outer blade surface that defines the concave area so that the outer blade surface is thereby at least partially protected from the incoming gas flow, the blade comprising a first and second side wall defining a central cavity, and wherein a joint that joins together the first and second side walls is positioned within the concave area and there is no flow communication between the concave area and the central cavity, the concave area extends from a root of the blade to a top of the blade, and the concave area is more pronounced at at least one of the root of the blade and the top of the blade than at a region between the root of the blade and the top of the blade.

2. The blade as claimed in claim 1, wherein the concave area is arranged substantially centrally in the front end relative to first and second outer walls that define the blade in a transverse direction.

3. The blade as claimed in claim 1, wherein a width of the concave area in a transverse direction of the blade is at least 10% of a width of the front end.

4. The blade as claimed in claim 1, wherein a depth of the concave area is at least 10% of a width of the front end.

5. The blade as claimed in claim 1, wherein the side walls are made of metal or composite material.

6. An aircraft engine component in an aircraft engine provided with a gas turbine comprising the blade as claimed in claim 1 wherein, in operation, the blade is subjected to a flow of fluid that passes the blade at high speed in a direction from the front end towards its rear end.

7. The aircraft engine component as set forth in claim 6, wherein the component is a structurally-supporting element.

8. The aircraft engine component as set forth in claim 6, wherein the component is a guide in a gas turbine stator.

9. A flow machine component comprising a plurality of blades extending in a radial direction from an element to which they are attached, which blades are arranged a distance apart around the circumference of the component, wherein at least one of the blades is a blade as claimed in claim 1.

10. A gas turbine, comprising at least one blade as claimed in claim 1.

11. An aircraft engine, comprising at least one blade as claimed in claim 1.

12. The blade as claimed in claim 1, wherein the side walls are made of metal and the joint is a welded joint.

13. The blade as claimed in claim 1, wherein the joint comprises a weld that protrudes from a surface surrounding the weld.

14. The blade as claimed in claim 1, wherein the concave area extends along all of a part of the blade subjected to fluid flow during operation.

15. A blade intended to be exposed to a gas flow at high speed, during operation of a flow machine comprising the blade, the blade comprising a front end designed to face towards the incoming gas flow and a rear end, the front end being provided with a concave area that forms, during operation, a stagnation point for the incoming gas flow at a distance in front of an outer blade surface that defines the concave area so that the outer blade surface is thereby at least partially protected from the incoming gas flow, the blade comprising a first and second side wall defining a central cavity, and wherein a joint that joins together the first and second side walls is positioned within the concave area and there is no flow communication between the concave area and the central cavity, the front end within the concave area is at least partially formed by wall parts, and at least one duct is arranged through at least one of the wall parts that form the front end within the concave area and the duct is at a non-zero distance from an outermost part of the front end.

16. The blade as claimed in claim 15, wherein the at least one duct opens out at an acute angle backwards in relation to an outer surface of the at least one of the wall parts through which the duct is arranged.

17. A section for a flow machine component, which section comprises a first and a second blade half, which are arranged a distance apart and are intended to form part of two adjacent blades in the component, which between them define a gas duct, with each of the blade halves comprising a front end designed to face towards an incoming gas flow during operation of a flow machine that comprises the component, and a rear end, wherein the front end of each of the blade halves is provided with a concave area that is such that a blade in the component formed by two blade halves from adjacent sections forms a blade concave area that gives rise to a stagnation point for the incoming gas flow at a distance in front of an outer blade surface that defines the blade concave area and the outer blade surface is thereby at least partially protected from the incoming gas flow, the blade in the component formed by two blade halves from adjacent sections having a central cavity and there being no flow communication between the blade concave area and the central cavity, wherein the concave area extends from a root of the blade to a top of the blade, and the concave area is more pronounced at at least one of the root of the blade and the top of the blade than at a region between the root of the blade and the top of the blade.

18. A flow machine component comprising a plurality of sections that are joined together in the direction of the circumference and form a circular structure, wherein at least two of the the sections each form a section as claimed in claim 17.

19. A gas turbine, comprising at least one component as claimed in claim 18.

20. An aircraft engine, comprising at least one component as claimed in claim 18.

21. The section as set forth in claim 17, wherein the blade in the component formed by two blade halves from adjacent sections comprises a welded joint that protrudes from a surface surrounding the weld.

22. The section as set forth in claim 17, wherein the blade concave area extends along all of a part of the blade subjected to fluid flow during operation.

* * * * *